(12) United States Patent
Matsumoto

(10) Patent No.: US 6,233,499 B1
(45) Date of Patent: May 15, 2001

(54) METHOD AND APPARATUS FOR DESIGNING MOLDS USING 3-DIMENSIONAL CAD SYSTEM

(75) Inventor: Toshifumi Matsumoto, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/097,821

(22) Filed: Jun. 16, 1998

(30) Foreign Application Priority Data

Aug. 29, 1997 (JP) .................................................. 9-234440
Oct. 22, 1997 (JP) .................................................. 9-289883
Nov. 25, 1997 (JP) .................................................. 9-322828

(51) Int. Cl.⁷ .................................................. G06F 19/00
(52) U.S. Cl. .......................... 700/197; 700/182; 700/118
(58) Field of Search ............................. 700/98, 118, 182, 700/197; 264/401, 1.24, 308

(56) References Cited

U.S. PATENT DOCUMENTS

| | | | | |
|---|---|---|---|---|
| 5,510,066 | * | 4/1996 | Fink et al. ........................... | 264/40.1 |
| 5,573,716 | * | 11/1996 | Jacobson .............................. | 264/40.7 |
| 5,805,971 | * | 9/1998 | Akedo ....................................... | 419/6 |
| 5,812,402 | * | 9/1998 | Nishiyama et al. .................... | 700/97 |
| 5,822,206 | * | 10/1998 | Sebastian et al. .................... | 700/100 |

FOREIGN PATENT DOCUMENTS

| | | |
|---|---|---|
| 07152721 | 6/1995 | (JP) . |
| 07152820 | 6/1995 | (JP) . |
| 07334555 | 12/1995 | (JP) . |

OTHER PUBLICATIONS

JP 224967 dated Aug. 22 is the JP Examination Report pp. 1–3.

* cited by examiner

*Primary Examiner*—William Grant
*Assistant Examiner*—Kidest Bahta
(74) *Attorney, Agent, or Firm*—Arent Fox Kintner Plotkin & Kahn

(57) ABSTRACT

A product solid (A) is generated on a CAD screen using a 3-dimensional CAD system, then thin film solids (B1 and B2) are added to the product solid so as to divide an object mold into parts or fill holes of the mold, and after this, the product solid (A) is united with the thin film solids (B1 and B2) into one, thereby to generate a thin film formed product solid. This thin film formed product solid is put in a rectangular solid, then the thin film formed product solid is removed from the rectangular solid, thereby to generate cavities in the rectangular solid. And, along these cavities, the mold is divided into a cavity solid and a core solid. In addition, the thickness (t) of each thin film solid is decided so as to prevent melted resin invasion. This method can thus divide a mold into a cavity and a core easily when product data is converted to solids for designing a mold using a 3-dimensional CAD system.

24 Claims, 16 Drawing Sheets

METHOD AND APPARATUS FOR DESIGNING MOLDS USING 3-DIMENSIONAL CAD SYSTEM

BACKGROUND OF THE INVENTION

1. Field of the Invention

The present invention relates to a method and an apparatus for designing structures of molds by converting product data to solids using a 3-dimensional CAD system. More particularly, the present invention relates to a method for dividing each mold into two parts (cavity and core) when molds are designed using a 3-dimensional CAD system.

2. Description of the Prior Art

Generally, as shown in FIGS. 20 to 23, when a 3-dimensional CAD system is used for designing molds, a product solid (3-dimensional shape model data of an object product, created by a computer) (A') (see FIG. 20) is put in a mold block solid (D') such as a rectangular solid, which is equivalent to a nesting in a mold base, then removed from the mold block solid, thereby to form a cavity (E') to become a product (an object formed with resin in the mold) in the mold block solid (FIG. 21). Then, the mold block solid is divided into upper and lower parts at this cavity assumed as a boundary, thereby to form a cavity solid (F') and a core solid (G') (FIG. 23). This dividing, however, includes many restrictions and problems when performed on a 3-dimensional CAD system. In other words, any of present CAD systems cannot cut such a mold block solid partially. When a mold block solid is cut unavoidably using such a present CAD system, therefore, the solid must be cut completely on its entire surface and then portions that should have not been cut must be put together after they are cut.

At present, for example, a general method for dividing such a mold block solid divides a rectangular solid along the cavity described above. In this case, at first, a surface (J) is added along a mold parting line and extended, thereby to divide the rectangular solid. The rectangular solid is thus divided all along the parting line of the mold repetitively (FIG. 22). After this, necessary portions are put together, thereby to generate a cavity solid (F') and a core solid (G') finally to design the object mold (FIG. 23).

A method for manufacturing molds using a 3-dimensional CAD system such way is disclosed in the official report of Unexamined Published Japanese Patent Application No. 8-4854 "Method for Manufacturing Molds". The technology disclosed in the patent applies only to very simple structured molds to be divided only at a reference parting line (2) respectively. The technology does not disclose anything about a method for dividing a mold into a cavity and a core when the mold is designed for a complicated shape product.

When in designing a mold using a 3-dimensional CAD system described above in the prior art method for dividing molds, a surface is extended as shown in FIG. 22 and a portion (K) that should not be divided is also divided. And, when such a dividing is repeated, a rectangular solid is divided into many models. Furthermore, generally, there are very few of simple structured molds, each of which is divided at a reference parting line as disclosed in the official report of Unexamined Published Japanese Patent Application No. 8-4854. In many cases, molds are very complicated in structure and each of them has many parts (parting positions). Each of those molds is divided into a cavity and a core by repeating such the dividing of parts. Consequently, the more a mold is complicated in structure, the more the time and labor for dividing parts of the mold are needed.

Furthermore, in the prior art dividing method, when such a sharp shape (N) as a junction between an arc (L) and a surface (M) is left as shown in FIG. 24, the mold cannot be divided. In addition, since it is difficult to divide the mold on a free curved surface and many dividing and sewing operations are needed, the accuracy of product solid data itself is degraded.

SUMMARY OF THE INVENTION

Under such the circumstances, it is an object of the present invention to provide a method for designing molds, which can divide each mold into a cavity and a core easily when in designing the mold by converting product data to solids using a 3-dimensional CAD system.

It is another object of the present invention to provide a method for designing molds, which can easily divide any mold complicated in structure and formed so that a nesting is formed in part of a parting portion of the mold.

It is also another object of the present invention to provide a method for manufacturing thin and thick film formed product solids for which mold parting lines can be set easily when in designing a mold using a 3-dimensional CAD system and a recording medium which stores elements composing each of the product solids.

It is also another object of the present invention to provide a concrete method for dividing each mold into a cavity and a core using a 3-dimensional CAD system, an apparatus for designing molds using such a method, and a recording medium which stores procedures of such designing.

The method of the present invention for designing molds using a 3-dimensional CAD system is characterized as follows; forming a first cavity in a mold block solid by removing a product solid from the mold block solid; forming a second cavity by removing an element solid having a specified thickness from the mold block solid, the second cavity being provided at a parting portion of the mold block solid; and dividing the mold block solid into a cavity solid and a core solid along the second and first cavities.

A "solid" mentioned above means data created from, for example, surface data of a product so as to be handled by a CAD system as data having a thickness. Such data as a product shape is referred to as a product solid and such data as a mold block is referred to as a mold block solid. An element solid means a solid having a fixed thickness so as to form a cavity at a parting line of a mold, such as a thin film solid for forming a third cavity which is thin at a parting line of a hole to, for example, divide a hole of a product, a thick film solid for forming a fourth cavity having an enough thickness including a parting line (the parting line is formed by adding a piece solid later), such as a whole hole and a block around a complicated parting line. The second cavity formed with such an element solid means a cavity including both the third cavity formed with a thin film solid described above and the fourth cavity formed with a thick film solid.

The element solid can also be formed with a thin film solid having a thickness within a value that does not become an obstacle to a clearance of any mold. The element solid can also be formed with a thick film solid including a parting line of the object mold. The thick film solid is removed from the mold block solid, thereby to form the fourth cavity and the mold block solid is divided into a cavity solid and a core solid using the fourth and first cavities, then piece solids formed by dividing the thick film solid at a parting line of the mold are added to a portion of the cavity and/or core solid, exposed by the fourth cavity, thereby to design both cavity and core of the mold.

The method of the present invention for forming a thin film formed product solid (a product solid with a thin film)

when in designing a mold using a 3-dimensional CAD system is characterized as follows; at first, a product solid is generated by modeling the shape of a product, then a thin film solid composing a parting line of the mold is added to the product solid, thereby to unite the product solid with the thin film solid. Furthermore, the method for forming a thick film formed product solid (a product solid with a thick film) is characterized as follows; at first, a product solid is generated by modeling the shape of a product, then a thick film solid covering at least part of a hole and/or a complicatedly structured parting portion of the product solid is added to the product solid, thereby to unite the product solid with the thick film solid.

The recording medium of the present invention stores data (program) including a product solid formed by modeling the shape of a product and a thin film solid added to the product solid and composing a parting portion of the mold. The recording medium in other embodiments stores data (program) including a product solid formed by modeling the shape of a product and a thick film solid added to the product solid and covering at least part of a hole and/or a complicatedly shaped parting portion of the product solid.

The method of the present invention for dividing molds using a 3-dimensional CAD system, when in generating the shape of a product for a mold, (a) generates a product solid by modeling the shape of the product, then adds a thin film solid to the product solid unitarily, thereby to generate a thin film formed product solid; (b) puts the thin film formed product solid in a mold block solid, then removes the thin film formed product solid from the mold block solid, thereby to generate the first cavity on the basis of the product solid and the third cavity on the basis of the thin film solid respectively in the mold block solid; and (c) divides the mold into a cavity and a core along the first and third cavities.

Furthermore, when the thickness of the thin film solid is decided to become a clearance that prevents melted resin invasion for forming an object with resin using a mold, an injection type mold can be designed easily.

When a thin film formed product solid is formed already, the thin film formed product solid to which a thin film solid composing a parting portion of the mold is added is put in a mold block solid, then the thin film formed product solid is removed from the mold block solid, thereby to generate the first cavity on the basis of the product solid and the third cavity on the basis of the thin film solid respectively in the mold block solid, then the mold block solid is divided along the first and third cavities, thereby to divide the mold into a cavity and a core.

Another aspect for a concrete method of the present invention for dividing molds using a 3-dimensional CAD system is characterized by the following processes; (d) for generating a product solid by modeling the shape of a product, then adding a hole solid to the product solid unitarily so as to fill a hole of the product solid and generate a hole formed product solid, (e) for putting the hole formed product solid in a mold block solid, then removing it from the mold block solid, thereby to generate the first cavity on the basis of the product solid and the fourth cavity on the basis of the hole solid respectively in the mold block solid, (f) for dividing the mold block solid having the first and fourth cavities into two or more mold composing parts solids along the first and fourth cavities, and (g) for uniting piece solids obtained by dividing a solid of the same shape as that of the hole solid at a parting line of the mold with a portion of a divided mold composing parts solid, which is equivalent to the fourth cavity, thereby to divide the mold block solid, then divide the mold into a cavity and a core.

If a hole formed product solid is already formed at this time, the mold is divided into a cavity and a core in the following processes; (h) for putting the hole formed product solid to which a hole solid for filling the hole of the product solid is added is put in a mold block solid, then removing it from the mold block solid, thereby to generate the first cavity on the basis of the product solid and the fourth cavity on the basis of the hole solid respectively in the mold block solid, (f) for dividing the mold block solid having the first and fourth cavities into 2 or more mold composing parts solids along the first and fourth cavities, and (g) for uniting piece solids obtained by dividing a solid of the same shape as that of the hole solid at a parting line of the mold with a portion of a divided mold composing parts solid, which is equivalent to the fourth cavity, thereby to divide the mold block solid, then divide the mold into a cavity and a core.

The wall of the hole solid can be varied within a thickness so that an upper limit value that arises no problem from the structure of the product and a lower limit value that can be set to as close to 0 (zero) as possible. This wall of the hole solid can be regarded to be 0 virtually, for example, when a solid having the same thickness is added to the mold block solid after the hole solid is removed from the mold block solid.

The hole solid can be formed at least at part of a hole, a deformed part, a bushing, a sliding core, and each of various pins. A rectangular block solid can be used as the mold block solid.

The apparatus of the present invention for designing molds using a 3-dimensional CAD system comprises a means for generating a product solid by modeling the shape of a product, then adding a thin film solid to the product solid unitarily, thereby to generate a thin film formed product solid; a means for putting the thin film formed product solid in a mold block solid, then removing the thin film formed product solid from the mold block solid, thereby to generate the first cavity on the basis of the product solid and the third cavity on the basis of the thin film solid respectively in the mold block solid; and a means for dividing the mold block solid along the first and third cavities.

Another aspect of the apparatus of the present invention for designing molds comprises a means for putting a thin film formed product solid to which a thin film solid composing a parting portion of the mold is added in a mold block solid, then removing the thin film formed product solid from the mold block solid, thereby to generate the first cavity on the basis of the product solid and the third cavity on the basis of the thin film solid respectively in the mold block solid; and a means for dividing the mold block solid along the first and third cavities.

Another aspect of the apparatus of the present invention for designing molds comprises a means for generating a product solid by modeling the shape of a product, then adding a hole solid to the product solid unitarily, thereby to fill a hole of the product solid and generate a hole formed product solid; a means for putting the hole formed product solid in a mold block solid, then removing the hole formed product solid from the mold block solid, thereby to generate the first cavity on the basis of the product solid and the fourth cavity on the basis of the hole solid respectively in the mold block solid; a means for dividing the mold block solid having the first and fourth cavities into two or more mold composing parts solids along the first and third cavities; and a means for uniting piece solids obtained by dividing a solid of the same shape as that of the hole solid at a parting line of the mold with a portion of a divided mold composing parts solid, which is equivalent to the fourth cavity, thereby to divide the mold block solid.

Another aspect of the apparatus of the present invention for designing molds comprises a means for putting a hole formed product solid to which a hole solid for filling a hole of the product solid is added in a mold block solid, then removing the hole formed product solid from the mold block solid, thereby to generate the first cavity on the basis of the product solid and the fourth cavity on the basis of the hole solid respectively in the mold block solid; a means for dividing the mold block solid along the first and fourth cavities into two or more mold composing parts solids; and a means for uniting piece solids obtained by dividing a solid of the same shape as that of the hole solid at a parting line of the mold with a portion of a divided mold composing parts solid, which is equivalent to the fourth cavity, thereby to divide the mold block solid.

The recording medium of the present invention stores a program for performing the processes (a) for generating a product solid by modeling the shape of a product, then adding a thin film solid to the product solid unitarily, thereby to generate a thin film formed product solid, (b) for putting the thin film formed product solid in a mold block solid, then removing it from the mold block solid, thereby to generate the first cavity on the basis of the product solid and the third cavity on the basis of the thin film solid respectively in the mold block solid, and (c) for dividing the mold block solid along the first and third cavities.

Another aspect of the recording medium of the present invention stores a program for performing a process for putting the thin film formed product solid to which a thin film solid composing a parting portion of the mold is added in a mold block solid, then removing it from the mold block solid, thereby to generate the first cavity on the basis of the product solid and the third cavity on the basis of the thin film solid respectively in the mold block solid, a process for dividing the mold block solid along the first and third cavities so as to divide the mold into a cavity and a core.

Another aspect of the recording medium of the present invention stores a program for performing the processes (d) for generating a product solid by modeling the shape of a product, then adding a hole solid to the product solid unitarily, thereby to fill a hole of the product solid and generate a hole formed product solid; (e) for putting the hole formed product solid in a mold block solid, then removing the hole formed product solid from the mold block solid, thereby to generate the first cavity on the basis of the product solid and the fourth cavity on the basis of the hole solid respectively in the mold block solid; (f) for dividing the mold block solid having the first and fourth cavities into two or more mold composing parts solids along the first and fourth cavities; and (g) for uniting piece solids obtained by dividing a solid of the same shape as that of the hole solid at a parting line of the mold with a portion of a divided mold composing parts solid, which is equivalent to the fourth cavity, thereby to divide the mold block solid.

Another aspect of the recording medium of the present invention stores a program for performing a process (h) for putting a hole formed product solid to which a hole solid for filling a hole of the product solid is added in a mold block solid, then removing it from the mold block solid, thereby to generate the first cavity on the basis of the product solid and the fourth cavity on the basis of the hole solid respectively in the mold block solid, a process (f) for dividing the mold block solid into two or more mold composing parts solids along the first and fourth cavities, and a process (g) for uniting piece solids obtained by dividing a solid of the same shape as that of the hole solid at a parting line of the mold with a portion of a divided mold composing parts solid, which is equivalent to the fourth cavity, thereby to divide the mold block solid.

DETAILED DESCRIPTION OF THE PREFERRED EMBODIMENTS

Figure 1:
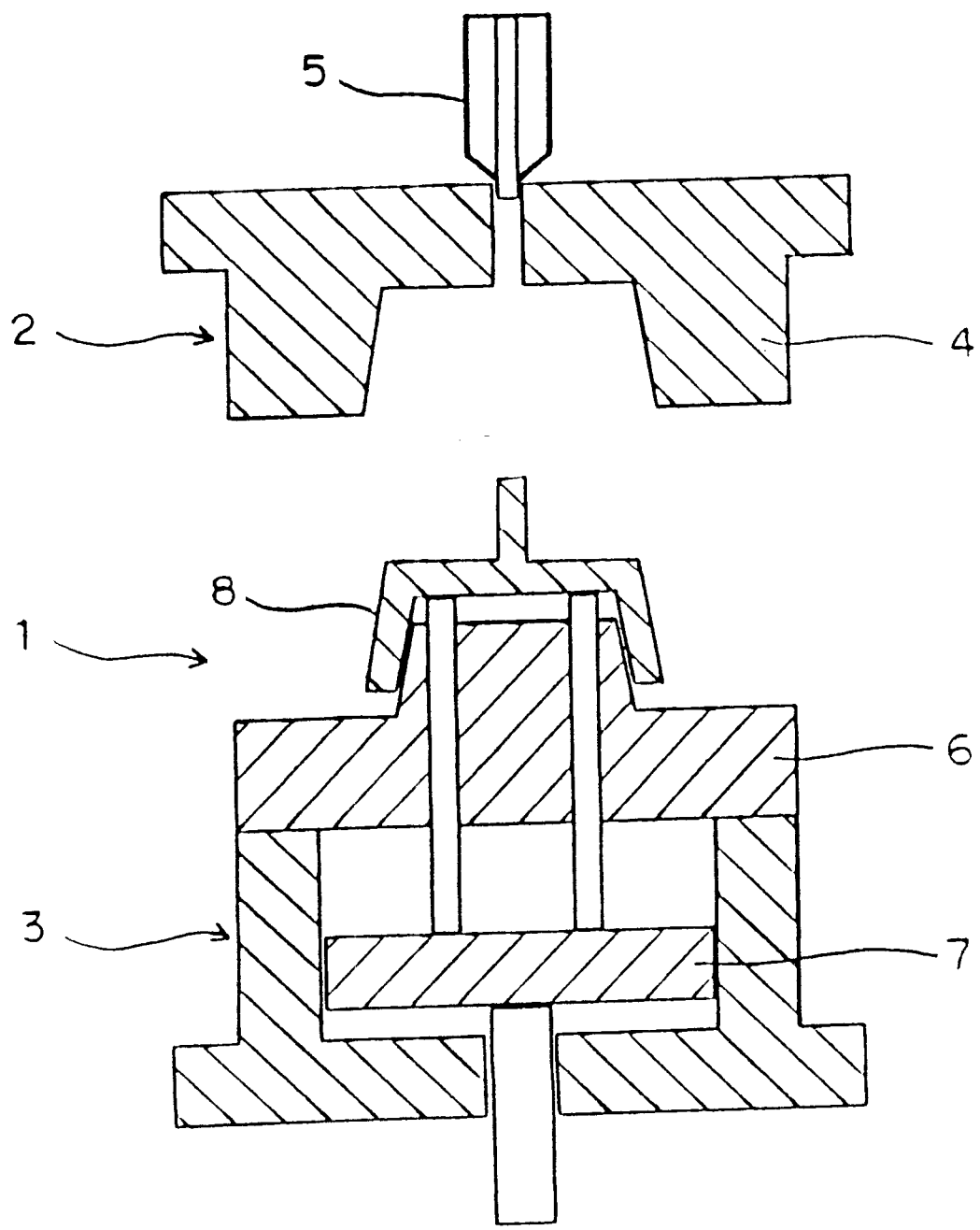
FIG. 1 is a schematic cross sectional view of the major configuration of an injection type mold, which is an embodiment of molds designed with the present invention.

Generally, an injection type mold, which is a metallic mold in an embodiment of the present invention, is structured as shown in FIG. 1.

In FIG. 1, the injection type mold 1 is composed of a fixed mold 2 and a movable mold 3. The fixed mold 2 is composed of a cavity 4, a gate 5, etc. The movable mold 3 is composed of a core 6, an ejecting part 7, etc.

In the case of the injection type mold structured as described above, an injection operation is performed as follows: resin is filled in a closed mold, then the mold is opened and the molded object is ejected by an ejecting part 7. Each molded object is produced in such a cycle.

Figure 2:
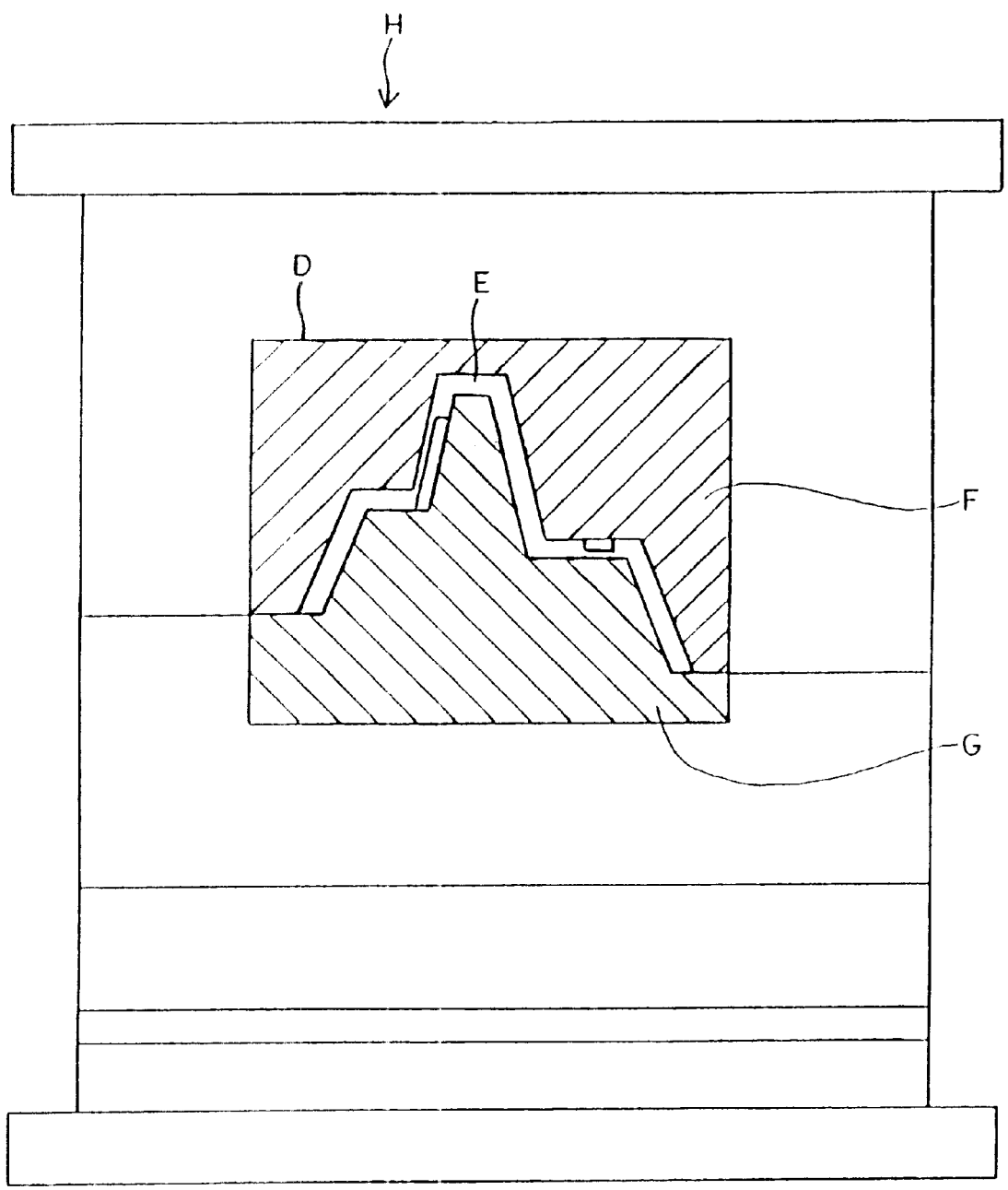
FIG. 2 is a schematic cross sectional view of a cavity solid (F) and a core solid (G) of a mold base solid (H) in a process in an embodiment for a method of the present invention for designing molds.

As shown in FIG. 2, when a mold is designed using a 3-dimensional CAD system, the actual shape of the object itself is modeled in a computer first, then the external appearance structure of the object product (the shape of cavity and core) and the inner structure of the parts such as sliding core of the object product are modeled.

When a 3-dimensional CAD system is used for designing a mold, the shape of the object product is completely converted to solids, thereby to enable the shape to be checked in detail, each of the parts to be simplified in structure, the strength of the product to be analyzed more effectively. Such a designing by a 3-dimensional CAD system can thus be positively involved in the upstream processes for planning/designing of the product.

In other words, since a solid shape is imaged from its 2-dimensional drawing, thereby to design a mold in the prior art 2-dimensional designing, the designing and manufacturing processes are also advanced sequentially. On the other hand, when in 3-dimensional designing, 3-dimensional CAD data is used effectively, thereby to perform processes such as designing and machining of the mold concurrently. As a result, technical information can be transmitted correctly between processes and the shape of the object product can be checked earlier, so that the product is materialized earlier.

Hereunder, a method for dividing a mold using product solids and a 3-dimensional CAD system will be explained with reference to the accompanying drawings. It is a very important point of the present invention. FIGS. 3 to 6 are schematic drawings explaining a simple model of molds. FIG. 7 is a flow chart of the designing.

Figure 3:
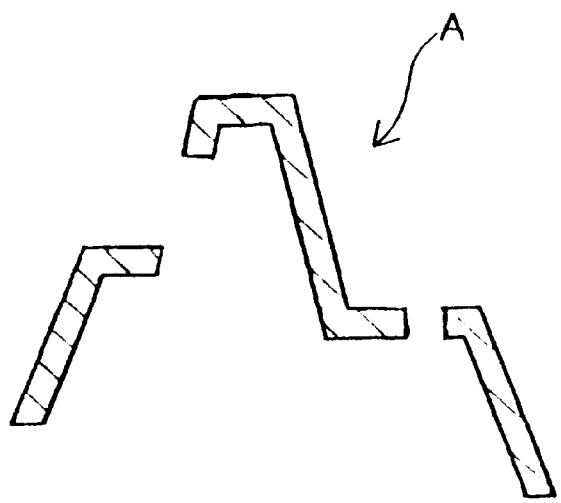
FIG. 3 is a cross sectional view of a product solid (A)

(1) surface data of each part of an object to mold is sewn, thereby to convert surface data to solid data and generate a product solid (A) (FIG. 3).

Figure 5:
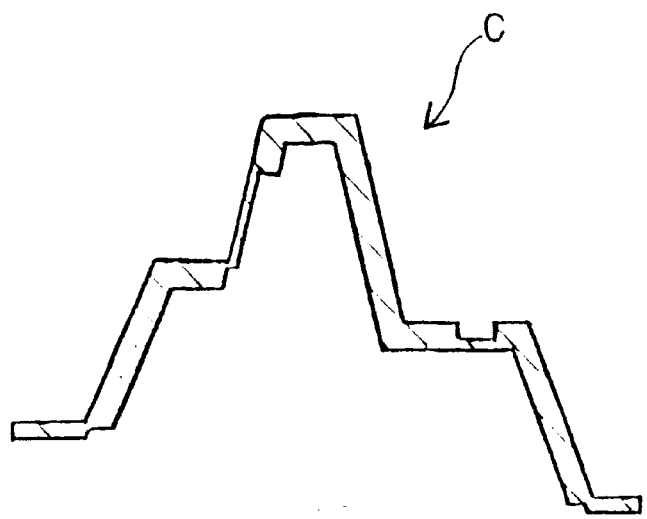
FIG. 5 is a cross sectional view of a thin film formed solid (C)

(2) A thin film solid (B) of 0.02 mm in thickness is added to the product solid (A), thereby to divide the mold into parts and fill holes, etc., that is, to (divided) parts of the mold (parting portions, which are outer peripheries of the product, holes, bushings, which are junctions for forming a nesting, ejection pins, etc.). As a result, the thin film solid (B) and the product solid (A) are unified into one, thereby to form a thin film formed product solid (C) (product solid (A)+thin film solid (B)) as shown in FIG. 5.

Figure 6:
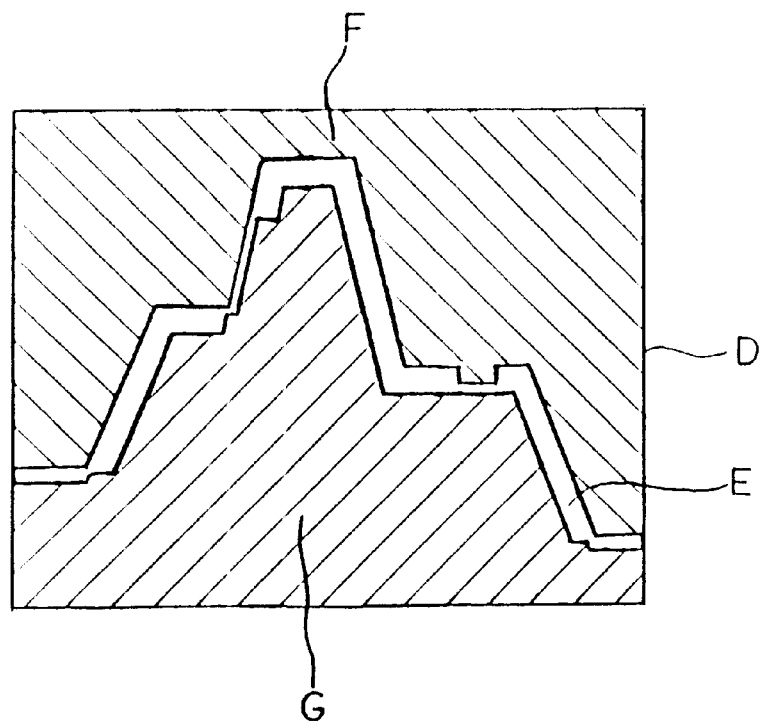
FIG. 6 is a cross sectional view indicating how the thin film formed solid (C) is removed from a rectangular solid (D)
Figure 7:
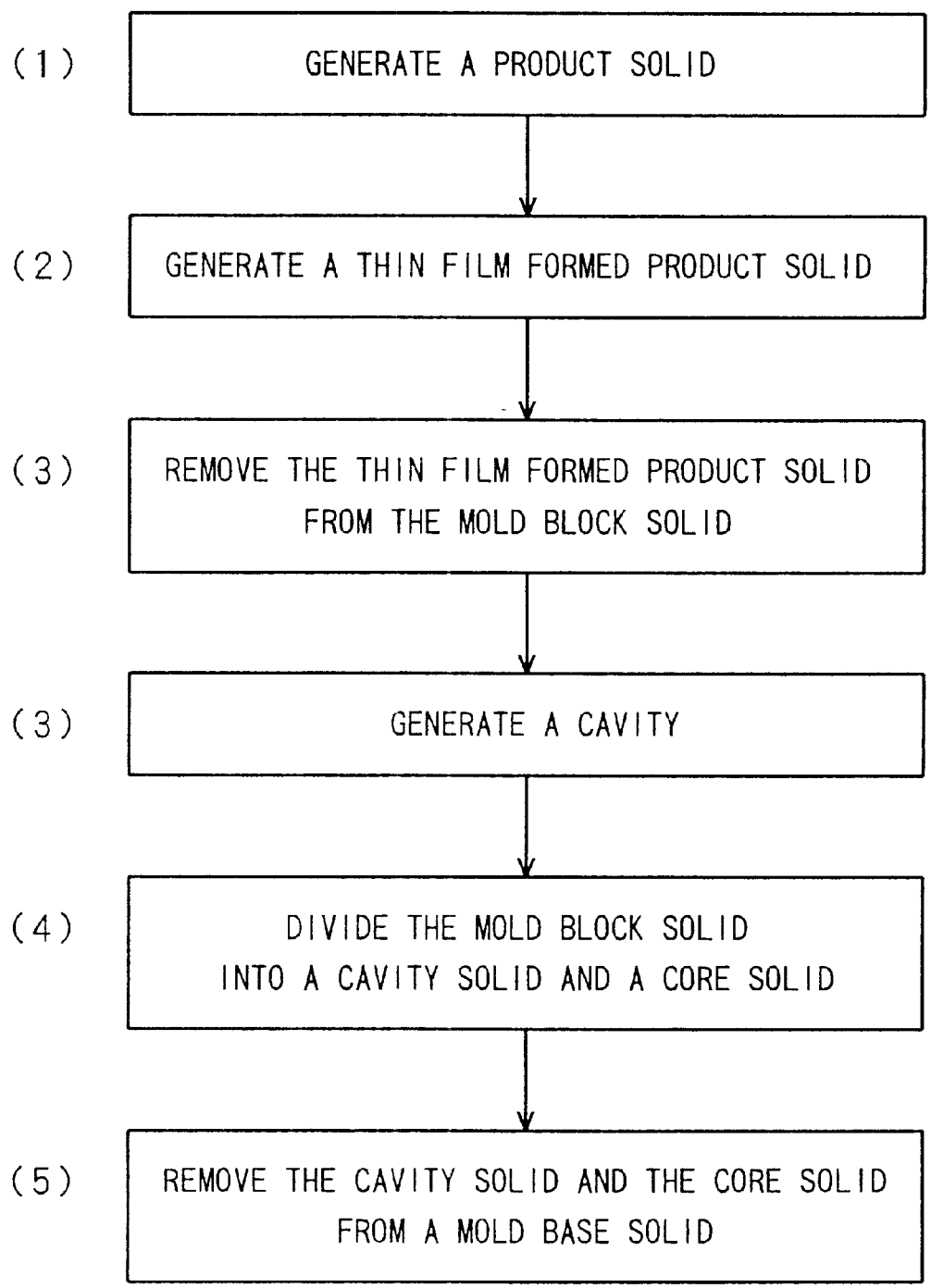
FIG. 7 is a flow chart indicating processes for completing a cavity or core solid element.

(3) The thin film formed product solid (C) is put in a rectangular solid (D), which is an example of a mold block solid equal to a mold plate, then the thin film product solid (C) is removed as shown in FIG. 6. Consequently, the product solid portion becomes the first cavity and the thin film solid portion becomes the third cavity. The mold block solid is not limited only to a rectangular one. It may be formed freely, for example, like a cylinder.

(4) Along the inner cavities (the first and third cavities) (E) of the rectangular solid (D), the rectangular solid is divided into a cavity solid (F) and a core solid (G) as shown in FIG. 6.

(5) The cavity solid (F) and the core solid (G) are put in a mold base solid (H), then removed from the mold base solid (H) as shown in FIG. 1.

This completes designing of a mold using a 3-dimensional CAD system.

Figure 4:
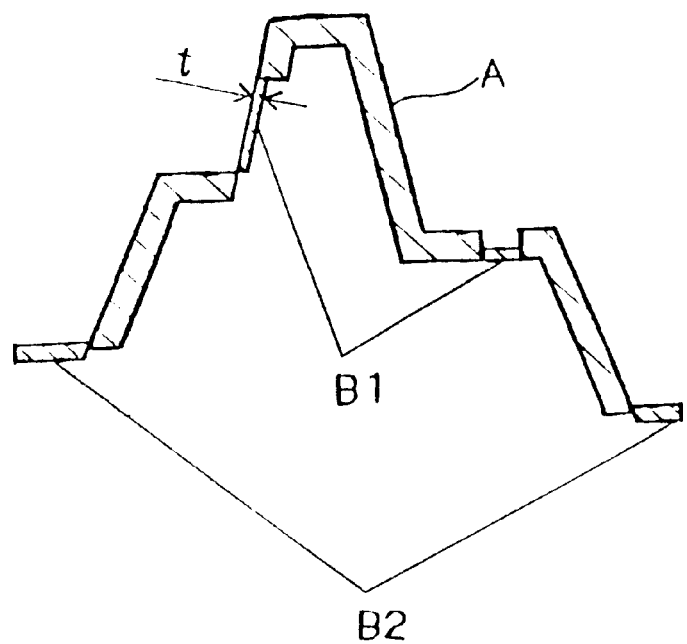
FIG. 4 is a cross sectional view indicating how thin film solids (B1 and B2) are added to the product solid (A)

In this embodiment, as shown in FIGS. 4 to 6, a thin film solid (B1) is generated in each of plural holes of the product shape, thereby to generate a thin film solid (B2) for each part that divides the mold into a cavity and a core. These two types of thin film solids (B) and the original product solid (A) are united into one, thereby to complete a solid model composed of one element.

In this embodiment, a mold block solid can be divided into a cavity solid (F) and a core solid (G) only by removing the thin film formed product solid (C) from the rectangular solid (D), so it is possible to design a mold composed of divided parts very quickly.

The thickness (t) of the thin film solids (B1 and B2) is 0.02 mm or so, for example, for injection type molds. This thickness can prevent melted resin invasion. In other words, the thickness can prevent generation of burr. The thickness is set so that accuracy can be secured for both CAD system and product data. In the case of a press mold, the clearance between punch and die differs among purposes. According to the purpose, the thickness (t) of the thin film solids is decided. The thickness (t) is also decided according to the purpose for other molds.

The present invention has enabled any shape such as a free curve, etc. to be divided very accurately, since an object is divided less frequently (only the reference part is divided) using a CAD system according to a method for dividing thin film solids developed on the basis of the inventor's (mold designer) peculiar idea that a clearance of about 0.02 mm or under does not become an obstacle to prevent melted resin invasion even in injection molding. The idea is obtained from molding technologies. In other words, in the case of a CAD system, when a parting line has no thickness (0), it is impossible to remove (subtract). Thus, it is only possible to add a surface as described above. If a concept that any solid can have a thickness is adopted, however, a parting line can be set partially only by removing a solid. And, when parting lines obtained such way are sewn, a mold block solid can be divided into parts. In addition, due to the present invention, in the mold machining data creating process which is at the downstream side of a product solid data creating process, if solid data of the present invention is used, it is possible to create machining data automatically, obtain very accurate machining data, as well as simplify the machining process because the data creating time is saved and the optimized machining method is decided according to the object existing manufacturing facility. In other words, each solid part of a solid model is used as is effectively in the machining process, so that no special time is needed for creating machining shape data.

Furthermore, since the external shape of a product is converted to solids using thin film solids, it is possible to prevent troubles that a blade bites an object due to wrong data input and input data missing when in machining. Very accurate machining data can thus be obtained. Furthermore, since a same model is used partially as needed, cavities, cores, electrodes, etc., which are main parts of an object, can be processed concurrently. Furthermore, the shape of each solid model of the present invention can be changed automatically only by changing the sizes when restrictions and related information are given to each size of the shape.

When such a series of processes is recorded on a recording medium, data of a product solid or a thin film formed product solid can be used together with the series of processes recorded on the recording medium, thereby to obtain a mold designing apparatus that can design molds, each of which is divided into a cavity and a core, using a CAD system.

In the above example, designing of a mold is started at generating a thin film solid using a product solid obtained from 3-dimensional data of the object product. However, since the thin film solid becomes a parting line of the mold, the product designer can specify a parting line of a desired mold by forming a thin filmed product solid for which a thin film is generated. On the other hand, the mold designer is not requested to generate a thin film solid after deciding a parting line under a discussion with the product designer. The designing can thus be speeded up significantly. Especially, now that paper is used less and less and product data is sent/received as product data recorded as product solids on a recording medium, there is no medium for specifying each parting line of a mold. The mold designer and the product designer must thus discuss for specifying each of the parting lines of the product. When the product designer records thin filmed product solids on a recording medium, therefore, such discussions can be omitted completely. In this case, mold designing is started at the process (3) shown in the flow chart in FIG. 7.

In the above embodiment, the third cavity is formed on one surface of a product hole and at a parting line (reference part shown as B2 in FIG. 4) of the mold where the product does not exist respectively, thereby to divide the mold. When right and left parting lines are symmetrical at a portion where the product does not exist, only the portion can be cut by the prior art parting line. When part of the mold is formed as a nesting, the method can also apply to the bushing of a portion in which the nesting mold is inserted.

In the above embodiment, when the holes and parting lines of the product are simple in shape, the mold can be divided very easily. When a parting line has a complicated uneven portion, however, it is difficult to form thin film solids for such a product. In other words, the parting line (parting face) of the thin film portion must be decided in advance. (This means that it must be decided in advance which mold parts (cavity and core) are used for an object hole.) When part face (parting face or parting line) is too complicated to decide a parting line, the above "thin film solid method" cannot be applied. In addition, when a part face is already decided, but no thin film solid can be applied due to the part face accuracy or any shape-related factor (for example, when a part face has an uneven portion, the thickness of the thin film portion is not fixed to a value), the above "thin film solid method" cannot be used.

Figure 19:
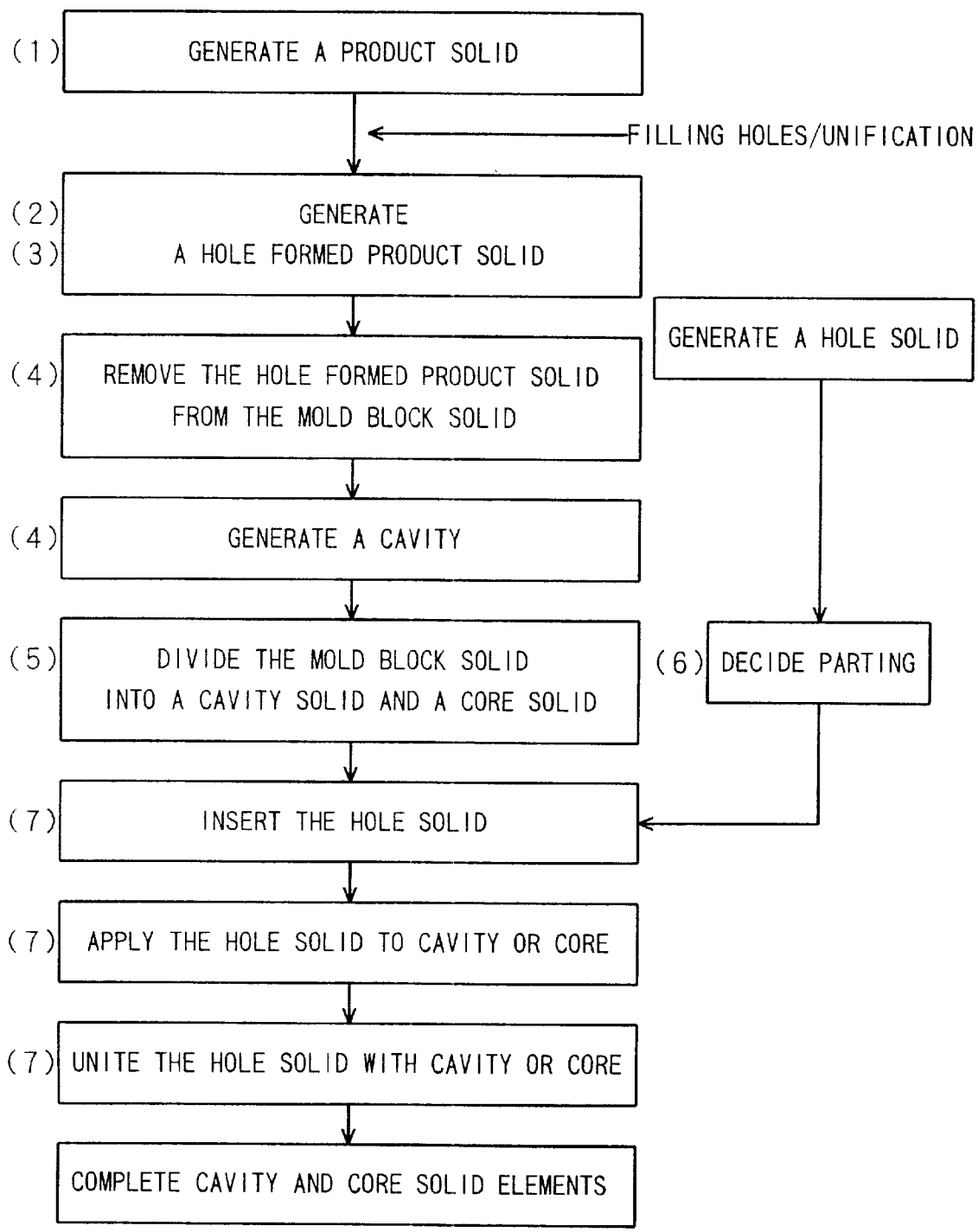
FIG. 19 is a flow chart indicating processes for completing a cavity or core solid element.
Figure 20:
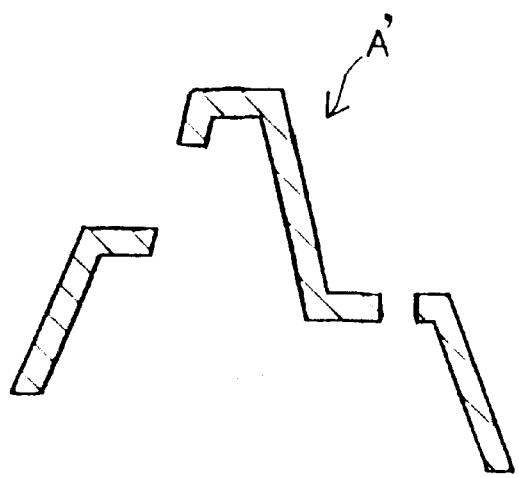
FIG. 20 is a cross sectional view of a product solid (A') in a prior art embodiment.
Figure 21:
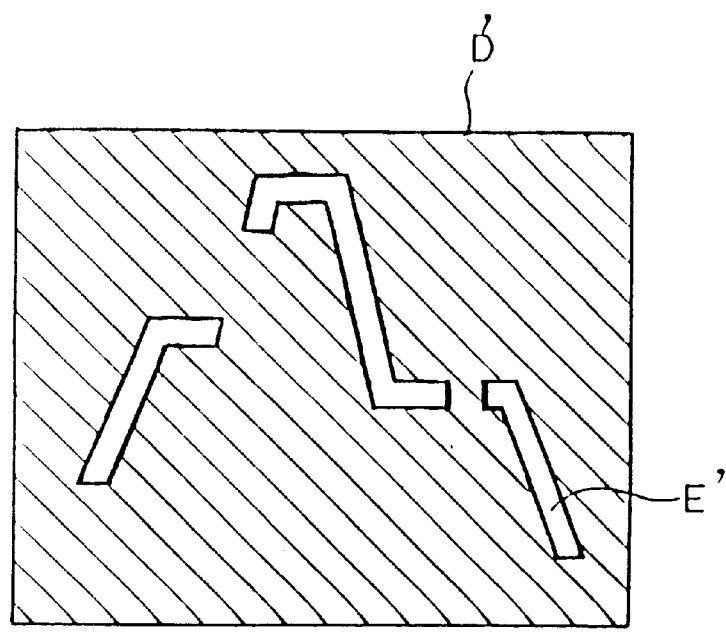
FIG. 21 is a cross sectional view indicating how the product solid (A') is removed from a rectangular solid (D')
Figure 22:
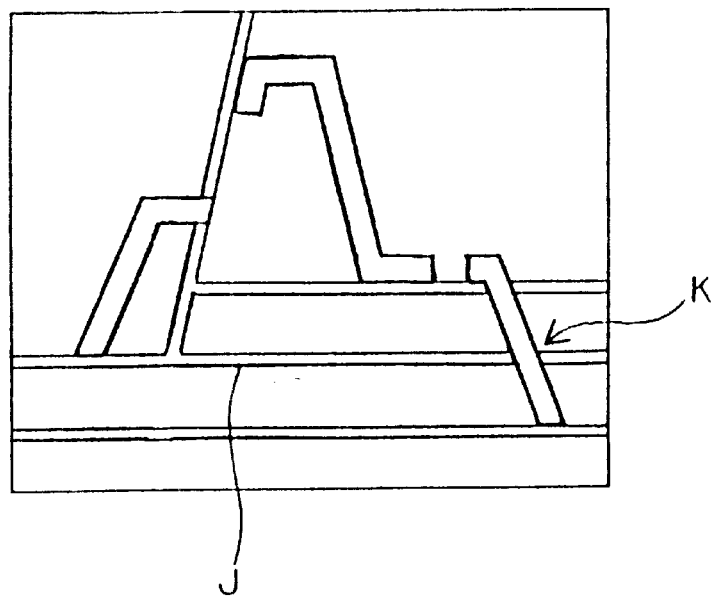
FIG. 22 is a cross sectional view indicating how a surface (J) is added and extended, thereby to divide a mold.
Figure 23:
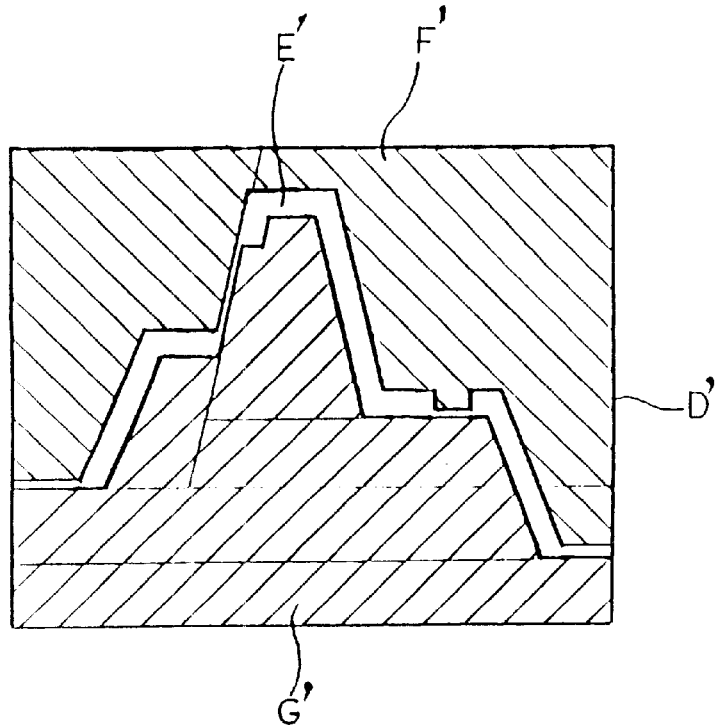
FIG. 23 is a cross sectional view indicating how necessary portions are put together by repeating dividing, thereby to generate a cavity (F') and a core (G')
Figure 24:
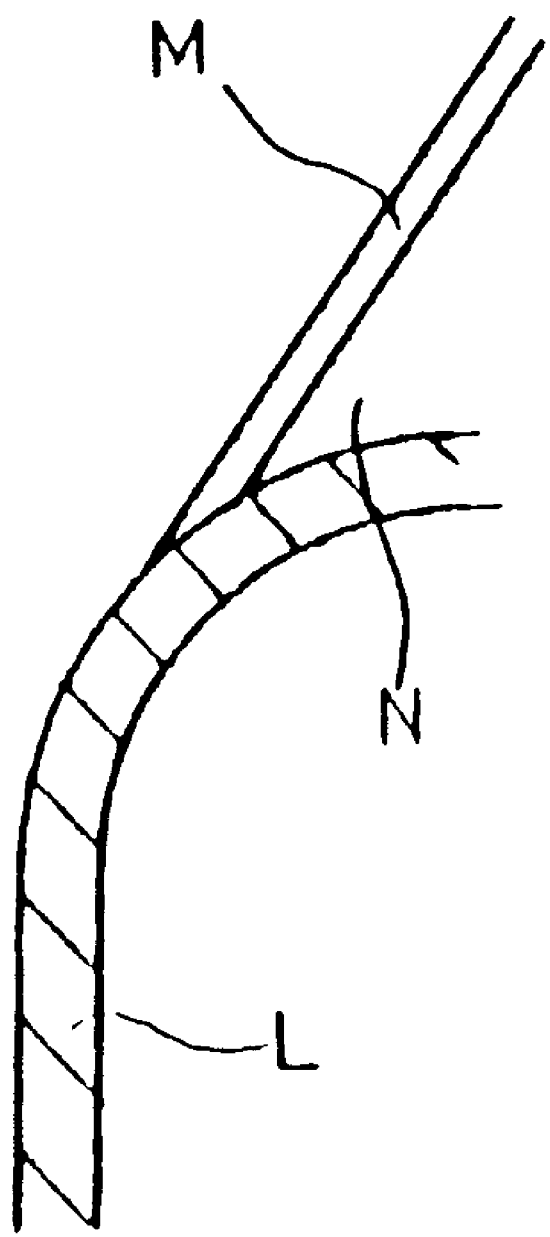
FIG. 24 is a cross sectional view indicating a state of a mold when an arc (L) and a sharp shape such as a tangent line (N) of a surface (M) are left.

The following embodiment is suitable for such a case. In other words, in the embodiment, it is not form a narrow cavity that can prevent melted resin invasion even when in injection molding by removing a thin film solid from a mold block solid, but a lump-like cavity including the parting line is formed by removing a thick film solid from a mold block solid, thereby to divide the mold block solid, then sewing divided thick film solids (piece solids) on parting lines, thereby to form a cavity solid and a core solid. Removal of product solids using a 3-dimensional CAD system is the same as that described above. Hereunder, this embodiment will be described in detail with reference to the accompanying drawings (FIGS. 8 to 18) for a simple model and a flow chart (FIG. 19).

Figure 9:
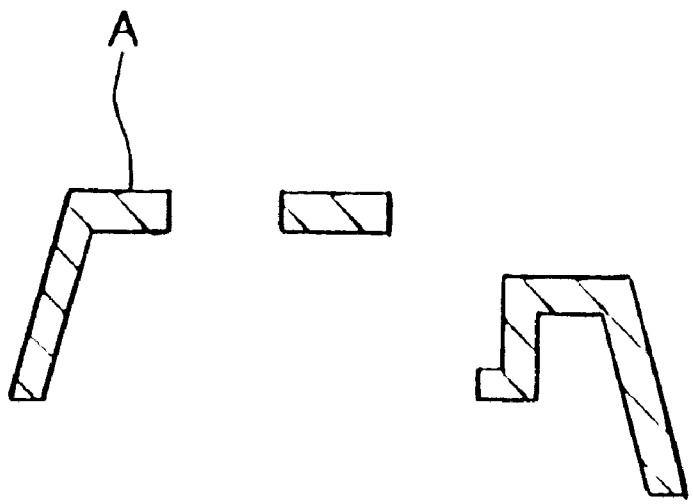
FIG. 9 is a cross sectional view of the product solid (A)

(1) Surface data of each part of a product is sewn, thereby to form a surface data solid and generate a product solid (A) as shown in FIG. 9.

Figure 10:
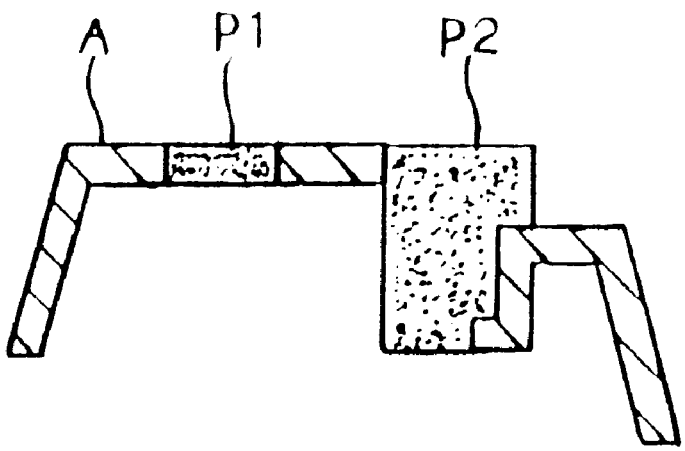
FIG. 10 is a cross sectional view indicating how a hole of the product solid (Q) is filled.
Figure 11:
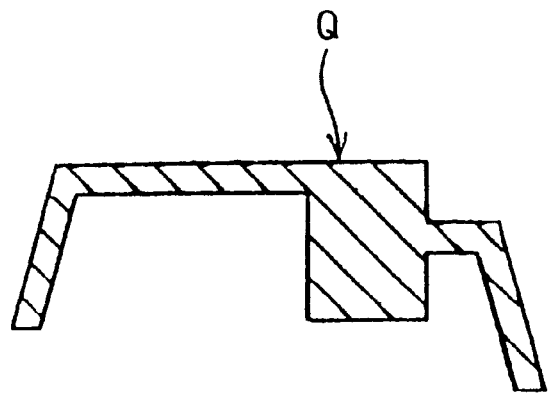
FIG. 11 is a cross sectional view of the hole formed product solid (Q)

(2) A hole solid (P1) is added to the product solid (A) unitarily as shown in FIG. 10, thereby to form a hole-formed product solid (Q) (product solid (A)+hole solid (P1)) as shown in FIG. 11. The hole solid (P1) is a solid element, which is an average thick film solid.

(3) A hole solid (P2) is added to the product solid (A) unitarily as shown in FIG. 10, thereby to form a hole (thick film)-formed product solid (Q) (product solid (A)+hole (thick film) solid (P2)) as shown in FIG. 11. The hole solid (P2) is a thick film solid (a hole, a deformed part, a bushing, a sliding core, and each of various pins) surrounding the product solid (A) including the holes.

Figure 12:
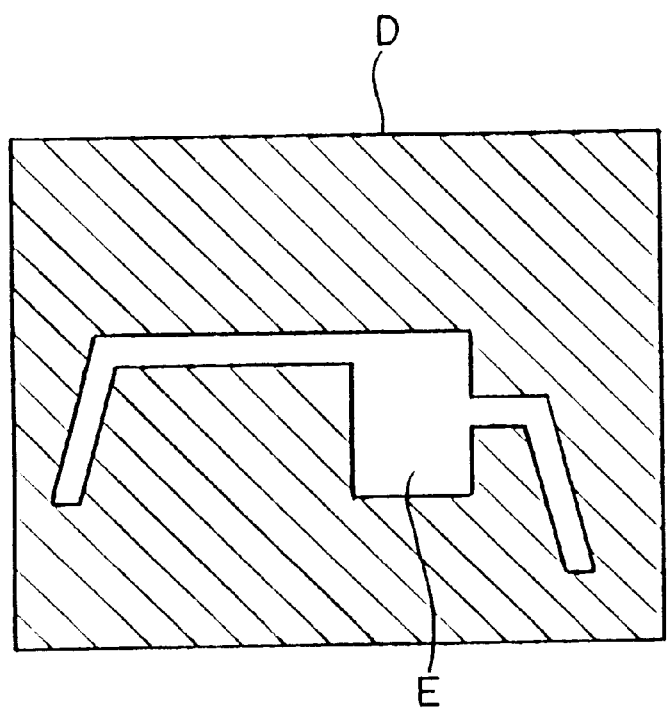
FIG. 12 is a cross sectional view indicating how the hole formed product solid (Q) is removed from a mold block solid (D)

(4) The hole (thick film)-formed product solid (Q) is put in a mold block solid (D), which is equivalent to a mold template, thereby to remove the hole (thick film)-formed product solid (Q) and generate an inner cavity (E) (the first cavity formed by the product solid and the fourth cavity formed by the hole (thick film)-solid) as shown in FIG. 12.

Figure 13:
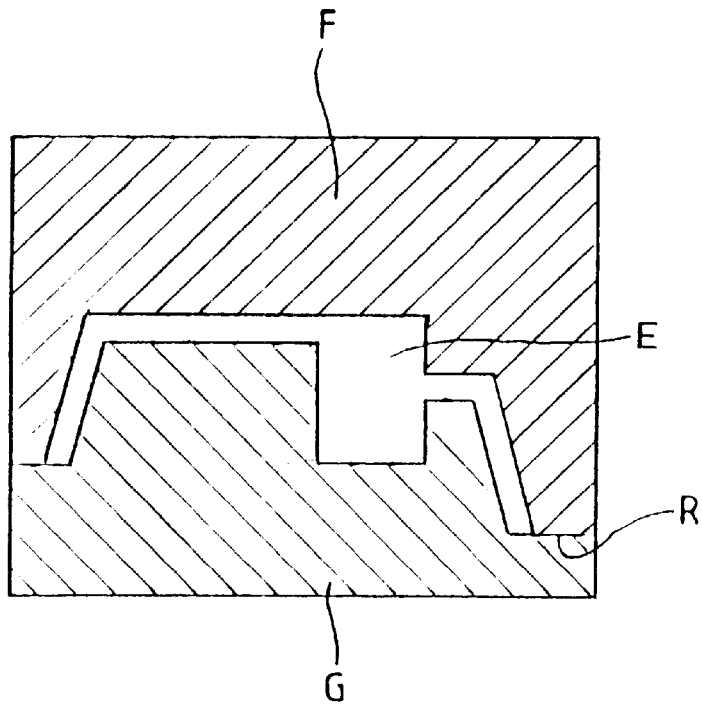
FIG. 13 is a cross sectional view indicating how the cavity solid (F) and the core solid (G) formed by dividing a mold block solid at a mold parting line (R)
Figure 14:
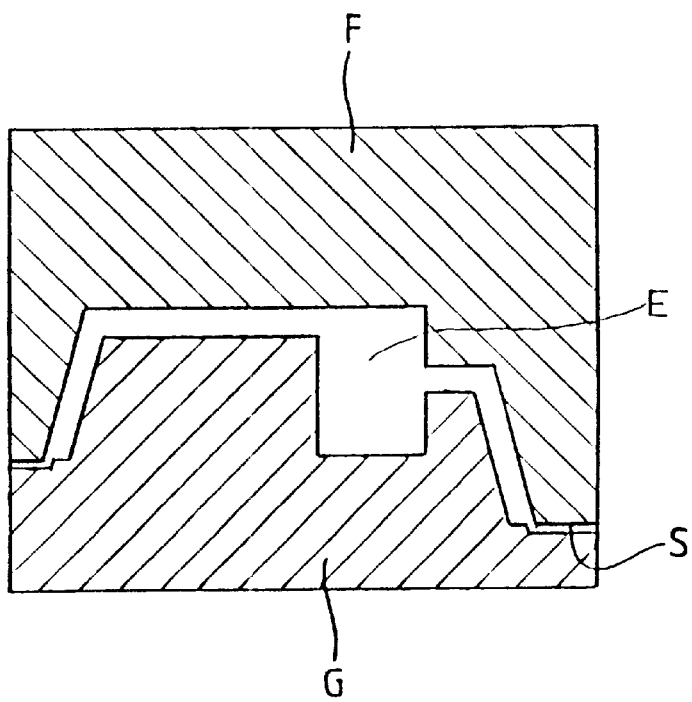
FIG. 14 is a cross sectional view indicating how the cavity solid (F) and the core solid (G) are formed by dividing the mold block solid at a mold parting solid (S)

(5) The mold block solid (D) having the inner cavity (E) is divided into a cavity solid (F) and a core solid (G) (a sliding core is provided for some products) by the inner cavity and the parting line (parting line of a mold that does not include a product solid) (R) as shown in FIG. 13 or the parting solid (S) as shown in FIG. 14.

Figure 15:
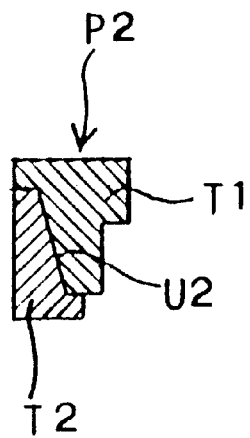
FIG. 15 is a cross sectional view indicating how a hole solid (P2) is divided by a parting line (U2)
Figure 16:
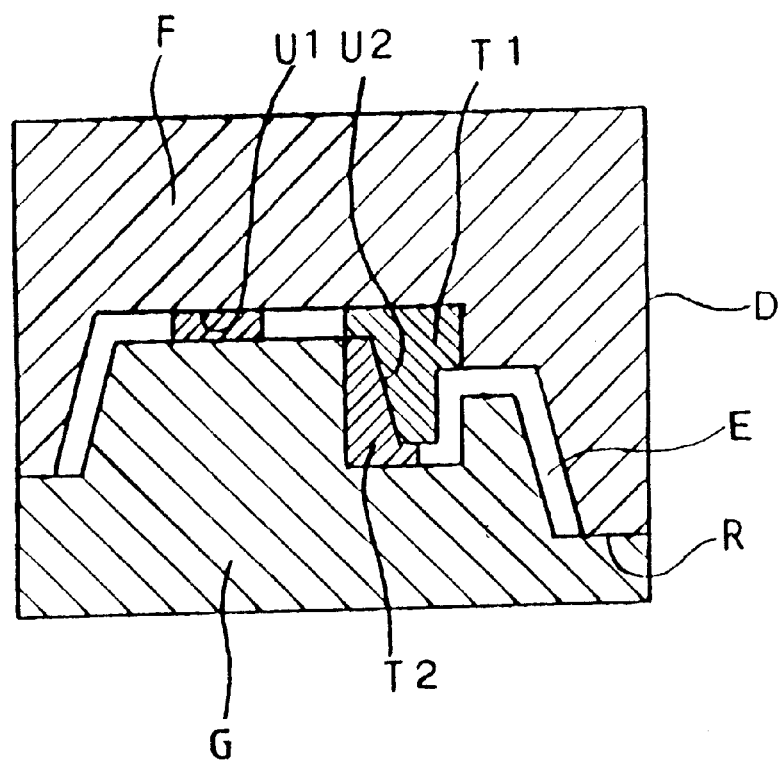
FIG. 16 is a cross sectional view indicating how hole solids (P1 and P2) are added to a cavity (E)

(6) Parting lines (U1 and U2) of the hole solids (P1 and P2) are decided. In other words, the hole solid (P1) is divided at the parting line (U1) and the hole solid (P2) is divided at the parting line (U2) into a cavity side piece solid (T1) and a core side piece solid (T2) respectively as shown in FIGS. 15 and 16.

Figure 17:
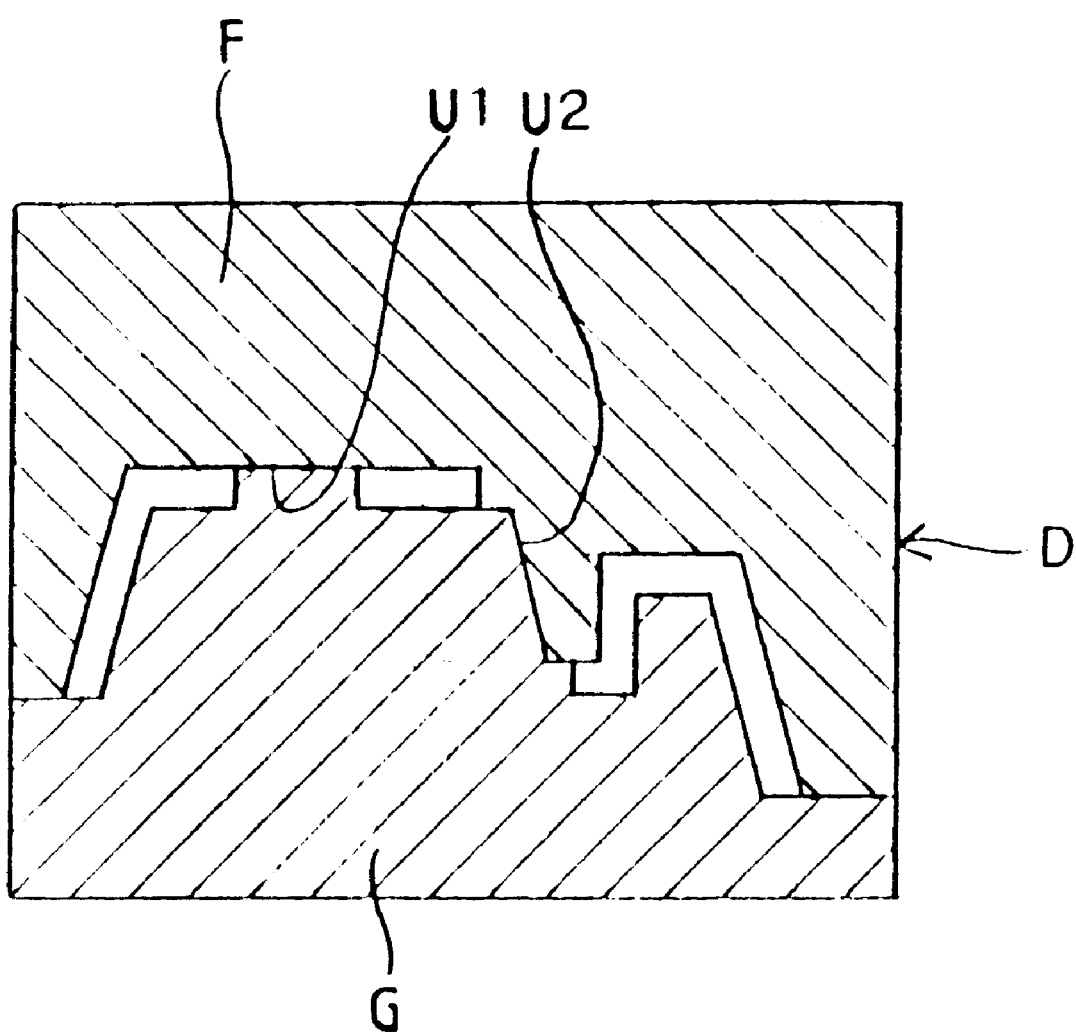
FIG. 17 is a cross sectional view indicating how a cavity side piece solid (T1) is united with the cavity solid (F) unitarily and a hole solid (P1) and a core side piece solid (T2) are united with the core solid (G) unitarily.
Figure 18:
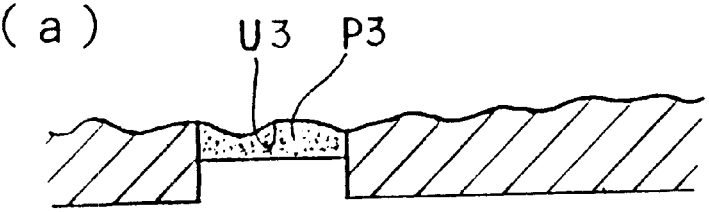
FIGS. 18(a) to 18(e) are cross sectional views indicating how a mold is divided when a disconnected uneven portion (U3) exists.
Figure 18:
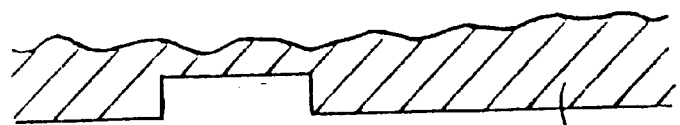
Figure 18:
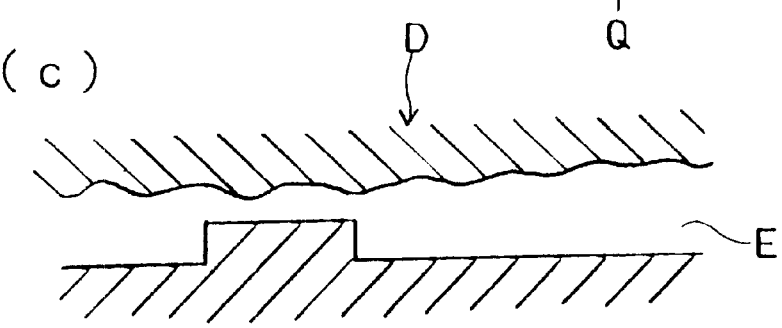
Figure 18:
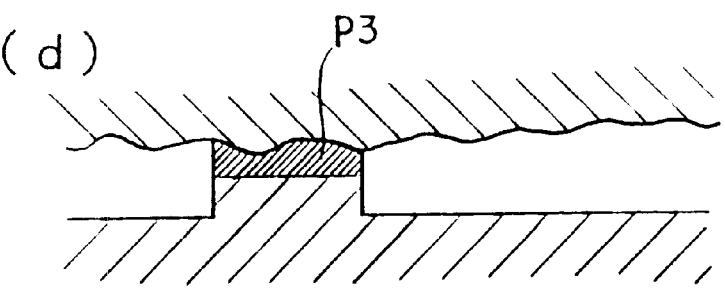
Figure 18:
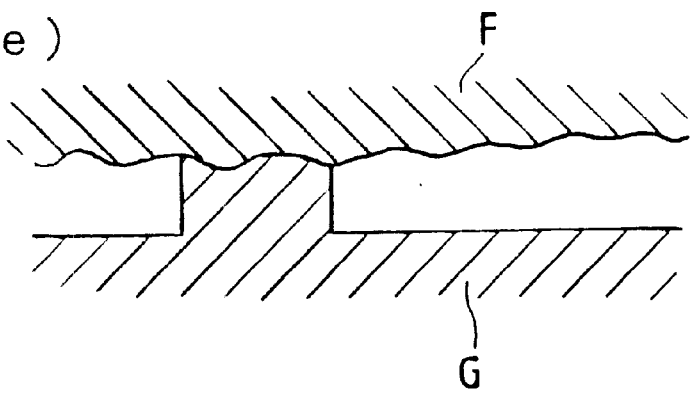

(7) The above divided piece solids (P1, T1 and T2) are united with the cavity solid (F) and the core solid (G). In other words, the hole solid (P1) is united with the core solid (G). In the case of the hole solid (P2), the cavity side piece solid (T1) is united with the cavity solid (F) and the core piece solid (T2) is united with the core solid (G) as shown in FIG. 17.

This completes dividing of each solid element of mold parts into a cavity solid (F) and a core solid (G).

Figure 8:
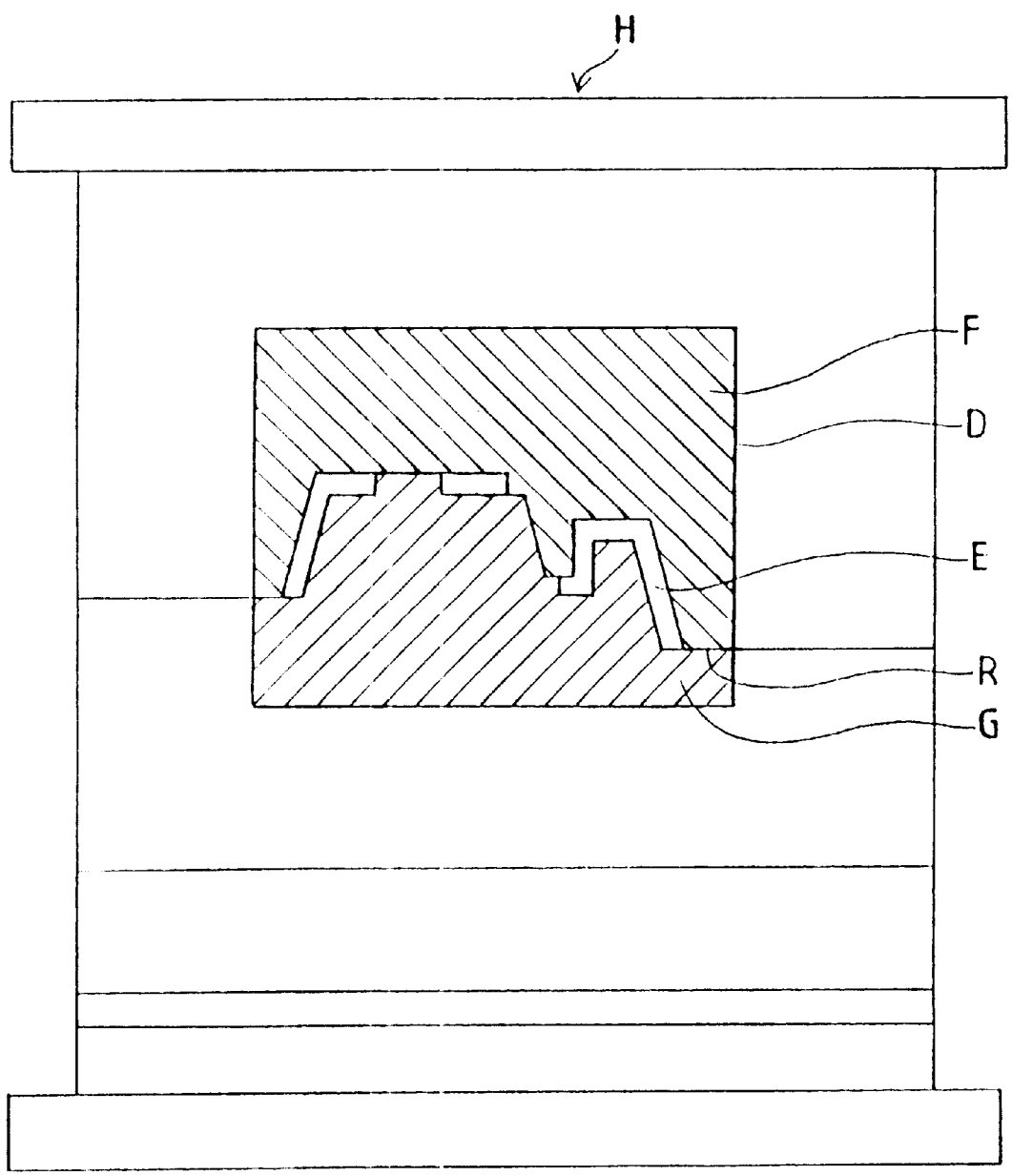
FIG. 8 is a schematic cross sectional view of the cavity solid (F) and the core solid (G) of the mold base solid (H) in a process of a method of the present invention for designing molds.

(8) The cavity solid (F) and the core solid (G) are put in the mold base (H), then they are removed as shown in FIG. 8.

This completes designing of the mold using a 3-dimensional CAD system.

In the case of the above "thin film solid method", when a thin film solid is added to a product solid, a parting line must be decided and the product solid must be divided into a cavity or core solid beforehand respectively. According to this embodiment, however, a mold block solid can be divided even when a hole solid (P2) has a complicated parting line. So, no part face can be identified or when a part face is decided, but no thin film solid can be used due to such a problem as accuracy of the part face or a shape-related factor.

The "part face accuracy" described above depends on a "thin film solid". The "thin film solid" allows a parting clearance (thin film thickness) to be set to 0.02 mm in thickness that can prevent melted resin invasion. When a fluidity resin material is used, however, the clearance must be zero. Otherwise, melted resin invasion cannot be prevented sometimes. Furthermore, in the case of parting of a bushing, and the like, the bushing will have to be press-fit at a negative common difference of the clearance. Consequently, the thick film solid in this embodiment is useful in such a case.

Even when a parting line has a discontinuous uneven portion, which is a "shape-related factor", this embodiment enables each solid to be divided easily. Because, the solid is divided by a thick film. It is only needed to add fine uneven surfaces to the solid later.

Hereunder, an embodiment that includes a "shape-related factor" described above will be described with reference to FIGS. 18(*a*) to 18(*e*).

(a) A hole solid (P3) is added to a product solid (A).

(b) The product solid (A) and the hole solid (P3) are united into one, thereby to form a hole-formed product solid (Q).

(c) The hole-formed product solid (Q) is put in a mold block solid (D), then the hole-formed product solid (Q) is removed, thereby to generate an inner cavity (E).

(d) The hole solid (P3) is inserted in the inner cavity (E).

(e) The hole solid (P3) is united with a core solid (G).

This completes dividing of a mold whose parting line has a discontinuous uneven portion in this embodiment.

Also in this embodiment, when this series of processes is programmed and recorded on a recording medium, solidified product data or a thin film formed product solid is used as is together with the recorded program, thereby to obtain a mold designing apparatus that can design molds, each of which is divided into a cavity and a core, using a CAD system.

In the above embodiment, designing of molds is started at creating of a thick film solid using a product solid composed of 3-dimensional data of the product. In this embodiment, however, the product designer can design a product whose parting line is complicated in shape using another block by forming a thick film formed product solid to which a thick film is generated by the product designer. In this case, designing of the mold is started at the process (4) in the flow chart shown in FIG. 19 for designing molds described in the above embodiment.

The software (program) created in the above embodiment is read into a computer (means) in which a 3-dimensional CAD system is installed, thereby to design molds 3-dimensionally. Furthermore, the above software is recorded on a recording medium such as a floppy disk, a CD, a DVD, and the like, and manufactured and sold to facilitate many mold designers in the world to make their designs.

In each of the above embodiments, a film (thin or thick)-formed product solid obtained by uniting a product solid (A) with an element solid (thin film solid B or thick film solid P) is removed from a mold block solid D, thereby to form a cavity. As a result, the parting line between the cavity and the core of a mold is designed automatically. In other words, a parting cavity is formed by calculating D−(A+B). Since such an addition and a subtraction are performed by a computer, however, it is the same as computing D−A−B. This means that the product solid A can be removed from the mold block solid D at first without creating a thin or thick film-formed product solid, then the parting thin film solid B or the thick film solid P is removed from the mold block solid D, thereby to obtain the same result. Important is that the element solid is removed from the mold block solid, thereby to divide the mold block solid into a cavity solid and a core solid for designing molds. The present invention is characterized by such a designing method.

Furthermore, in each of the above examples, an injection type mold is picked up, but those examples can also be used for designing other types of molds including press molding, casting, extrusion molding, blow molding, etc. And, when another type mold is used, the thickness of the thin film solid can be set freely appropriately to the object mold. In the above example, only a mold dividing method is explained, but in actual mold designing, other processes for a draft angle, etc. can be added, of course.

In the present invention, an element solid having a fixed thickness is removed from a mold block solid, thereby to form a cavity at a parting line in order to divide the mold. When the concept of the present invention is used, however, it will be possible in the future to divide the mold block solid by, for example, removing element solids, each of which has a fixed thickness, from a mold block solid, thereby to divide the mold block solid, then by adding a solid of the same thickness to the mold block solid so that 0 (zero) is subtracted from the mold block solid virtually, thereby to divide the mold block solid.

According to the present invention, therefore, when a mold is designed using a 3-dimensional CAD system, it is possible to set parting lines easily, save the designing time for dividing molds significantly and improve the accuracy of solid data.

Furthermore, when an element solid for forming a parting line of an object mold is added to a product solid and recorded on a recording medium, the product designer can display the parting line of the mold using the element solid so that his/her intention is to be understood and the use of paper is eliminated more effectively, as well as the mold designer is not requested to discuss with the product designer to advance his/her designing of the mold any longer. The designing time can thus be saved more significantly.

Furthermore, when thin film solids are used for designing molds, it becomes easier to divide each solid into a cavity and a core. And, when in an actual injection molding, it is possible to prevent such a problem as melted resin invasion.

In processes at the downstream side, machining data of a mold is created automatically from data of a cavity solid and a core solid that are obtained by dividing a mold block solid, so that very accurate machining data is obtained, as well as the machining time is much reduced. It is also possible to machine cavities, cores, electrodes, etc. that are major parts of a mold concurrently.

Furthermore, when thick film solids are used, a mold can be divided easily even when the mold has complicated shape parting lines. It is also possible to design a mold only by dividing a thick film solid later, then adding piece solids to the product solid. In such a case, therefore, the designing time for dividing the mold can be reduced significantly and any shaped molds can be divided using a 3-dimensional CAD system.

Although preferred embodiments have been described in some detail, it is to be understood that certain changes can be made by those skilled in the art without departing from the spirit and scope of the invention as defined by the appended claims.

What is claimed is:

1. A method for designing molds using a 3-dimensional CAD system, comprising steps of:

forming a first cavity in a mold block solid at a first region by removing a product solid from said mold block solid;

forming a second cavity in said mold block solid at a second region different from the first region by removing an element solid having a specified thickness from said mold block solid, said second cavity being provided at a parting portion of said mold block solid and being in communication with the first cavity, the first and second cavities extending at least substantially through the mold block solid from one end to an opposite end; and dividing said mold block solid into a cavity solid and a core solid along said second and first cavities.

2. A method for designing molds as defined in claim 1, wherein said element solid is formed with a thin film solid having a thickness within a value that never becomes an obstacle to a clearance of said mold.

3. A method for designing molds as defined in claim 1;

wherein said element solid is formed with a thick film solid including a parting line of said mold, and said thick film solid is removed from said mold block solid, thereby to form fourth cavity; and wherein said mold block solid is divided into a cavity solid and a core solid using said fourth and first cavities, then piece solids obtained by dividing said thick film solid at said parting line of said mold are added to a portion of said cavity solid and/or said core solid, which is exposed by said fourth cavity; thereby to design a cavity and a core of said mold.

4. A method for forming a thin film formed product solid used for designing a mold using a 3-dimensional CAD system, comprising the steps of:

forming a product solid by modeling the shape of a product; and adding a thin film solid composing a parting portion of said mold to said product solid unitarily to form a thin film formed product solid that, by removal from a mold block solid, defines a substantially complete parting line of the mold.

5. A recording medium on which data is recorded readably by a computer for designing a mold, said data including a product solid formed by modeling the shape of a product and a thin film solid to be added to said product solid to form a thin film formed product solid that, by removal from a mold block solid, defines a substantially complete parting line of the mold, said thin film solid composing a parting portion of said mold.

6. A method for forming a thick film formed product solid used for designing a mold using a 3-dimensional CAD system, comprising the steps of:

forming a product solid by modeling the shape of a product; and adding a thick film solid covering at least part of a hole and/or a complicated shape parting portion of said product solid to said product solid unitarily to form a hole thick film formed product solid that, by removal from a mold block solid, defines a substantially complete parting line of the mold, the substantially complete parting line extending through the thick film solid.

7. A recording medium on which program is stored readably by a computer for designing a mold, said program including a product solid formed by modeling the shape of a product and a thick film solid to be added to said product solid, said covering at least part of a hole and/or a complicated shape parting portion of said product solid to form a thick film formed product solid that, by removal from a mold block solid, defines a substantially complete parting line of the mold, the substantially complete parting line extending through the thick film solid.

8. A method for dividing each mold into a cavity and a core using a 3-dimensional CAD system when in designing molds by modeling the shape of a product, comprising processes:

(b) for putting a thin film formed product solid in a mold block solid, said thin film formed product solid being formed by adding a thin film solid composing a parting portion of said mold to a product solid to form a thin film formed product solid that extends substantially end to end across the mold, then removing said thin film formed product solid from said mold block solid, thereby to generate a first cavity on a basis of said product solid and a third cavity on a basis of said thin film solid respectively in said mold block solid the first and third cavities being in communication with each other; and (c) for dividing said mold along said first and third cavities, thereby to divide said mold into a cavity solid and a core solid.

9. A method for dividing each mold using a 3-dimensional CAD system as defined in claim 8, wherein another process (a) is added before said process (b), said another process (a) being provided for generating a product solid by modeling the shape of said product, then adding a thin film solid to said product solid unitarily, thereby to form a thin film formed product solid.

10. A method for dividing each mold using a 3-dimensional CAD system as defined in claim 9, wherein said thin film solid is added to said product solid at a portion equal to at least one place of a parting line between cavity and core of said mold, a bushing of said mold, an ejector pin of said mold or a hole of said product solid.

11. A method for dividing each mold using a 3-dimensional CAD system as defined in claim 9, wherein the thickness of said thin film solid is decided to become a clearance that can prevent melted resin invasion when said object is molded with resin using a mold.

12. A method for dividing each mold into a cavity and a core using a 3-dimensional CAD system when in designing molds by modeling the shape of a product, comprising processes:

(e) for putting a hole-formed product solid in a mold block solid that extends substantially across said mold block solid, said hole-formed product solid being formed by adding a hole solid to a product solid so as to fill a hole of said product solid, then removing said hole-formed product solid from said mold block solid, thereby to generate a first cavity on a basis of said product solid and a fourth cavity on a basis of said hole solid respectively in said mold block solid, the first and fourth cavities being in communication with each another;

(f) for dividing said mold block solid having the first and fourth cavities along said first and fourth cavities into two or more element mold parts solids; and (g) for uniting piece solids with a portion equal to said fourth cavity of said mold parts solid, said piece solids being obtained by dividing a solid having the same shape as that of said hole solid at a parting line of said mold.

13. A method for dividing each mold using a 3-dimensional CAD system as defined in claim 12, wherein another process (d) is added before said process (e), said another process (d) being provided for generating a product solid by modeling the shape of said product, then adding a hole solid to said product solid unitarily so as to fill said hole of said product solid, thereby to form a hole-formed product solid.

14. A method for dividing each mold using a 3-dimensional CAD system as defined in claim 13, wherein the wall thickness of said hole solid is decided to be within an upper limit value that can take said product shape to a lower limit value that can be set to as close to 0 (zero) as possible.

15. A method for dividing each mold using a 3-dimensional CAD system as defined in claim 13, wherein said hole solid is formed at least at part of a hole, a deformed part, a bushing, a sliding core, and one of various pins of said product solid.

16. A method for dividing each mold as defined in claim 8, wherein said mold block solid is a rectangular block solid.

17. An apparatus for designing molds using a 3-dimensional CAD system comprising:
  means for generating a first cavity on a basis of a product solid and a third cavity on a basis of a thin film solid respectively in a mold block solid by putting a thin film formed product solid in a mold block solid, said thin film formed product solid extending substantially across the mold block solid and being formed by adding said thin film solid composing a parting portion of an object mold to said product solid, then removing said thin film formed product solid from said mold block solid with the first and third cavities being in communication with each other; and
  means for dividing said mold block solid along said first and third cavities.

18. An apparatus for designing molds using a 3-dimensional CAD system as defined in claim 17 further comprising, means for generating a product solid by modeling the shape of a product, then adding a thin film solid to said product solid unitarily, thereby to generate a thin film formed product solid.

19. An apparatus for designing molds using a 3-dimensional CAD system comprising:
  means for generating a first cavity on a basis of a product solid and a fourth cavity in communication with the first cavity on a basis of a hole solid respectively in a mold block solid by putting a hole-formed product solid in a mold block solid, said hole-formed product solid being formed by adding said hole solid to said product solid so as to fill said hole of said product solid to form a unitary construction, then removing said hole formed product solid from said mold block solid;
  means for dividing said mold block solid having said first and fourth cavities along said first and fourth cavities into two or more element mold parts solids; and
  means for uniting piece solids obtained by dividing a solid having the same shape as that of said hole solid at a parting line of said mold with a portion equal to said fourth cavity of said divided mold parts solid.

20. An apparatus for designing molds using a 3-dimensional CAD system as defined in claim 19, further comprising, means for generating a product solid by modeling the shape of a product, then adding said hole solid to said product solid so as to fill a hole of said product solid unitarily, thereby to generate a hole-formed product solid.

21. A recording medium on which a program is recorded readably by a computer for designing molds, said program being for performing processes:
  (b) for generating a first cavity on a basis of a product solid and a third cavity in communication with the first cavity on a basis of a thin film solid respectively in a mold block solid by putting a thin film formed product solid in a mold block solid, said thin film formed product solid being formed by adding a thin film solid composing a parting portion of an object mold to a product solid to form a unitary construction extending substantially across the mold block solid, then removing said thin film formed product solid from said mold block solid; and
  (c) for dividing said mold block solid along said first and third cavities.

22. A recording medium as defined in claim 21, wherein another process (a) is added before said process (b), said another process (a) being provided for generating a product solid by modeling the shape of a product, then adding a thin film solid to said product solid unitarily, thereby to generate a thin film formed product solid.

23. A recording medium on which a program is stored readably by a computer for designing molds, said program being for performing processes:
  (e) for generating a first cavity on a basis of a product solid and a fourth cavity in communication with the first cavity on a basis of a hole solid respectively in a mold block solid by putting a hole-formed product solid in a mold block solid, said hole-formed product solid being formed by adding said hole solid to said product solid so as to fill said hole of said product solid to form a unitary construction extending substantially across the mold block solid, then removing said hole formed product solid from said mold block solid;
  (f) for dividing said mold block solid having said first and fourth cavities along said first and fourth cavities into two or more element mold parts solids; and
  (g) for uniting piece solids with a portion equal to said fourth cavity of said mold parts solid, said piece solids being obtained by dividing a solid having the same shape as that of said hole solid at a parting line of said mold.

24. A recording medium as defined in claim 23, wherein another process (d) is added before said process (e), said another process (d) being provided for generating a product solid by modeling the shape of a product, then adding a hole solid to said product solid unitarily so as to fill said hole of said product solid, thereby to generate a hole-formed product solid.

* * * * *